(12) United States Patent
Kalligudd et al.

(10) Patent No.: US 12,088,549 B2
(45) Date of Patent: Sep. 10, 2024

(54) MULTIPLE NETWORK INTERFACE DNS QUERY ROUTING

(71) Applicant: Ivanti, Inc.

(72) Inventors: Vagish Kalligudd, Bangaluru (IN); Saravana Pandiyan Andiyappan, Bangaluru (IN)

(73) Assignee: Ivanti, Inc., South Jordan, UT (US)

( * ) Notice: Subject to any disclaimer, the term of this patent is extended or adjusted under 35 U.S.C. 154(b) by 0 days.

(21) Appl. No.: 18/164,579

(22) Filed: Feb. 4, 2023

(65) Prior Publication Data

US 2023/0254277 A1     Aug. 10, 2023

(30) Foreign Application Priority Data

Feb. 5, 2022   (IN) .............................. 202211006251

(51) Int. Cl.
*H04L 61/4511* (2022.01)
*H04L 12/46* (2006.01)
*H04L 9/40* (2022.01)

(52) U.S. Cl.
CPC ...... *H04L 61/4511* (2022.05); *H04L 12/4633* (2013.01); *H04L 63/0272* (2013.01)

(58) Field of Classification Search
None
See application file for complete search history.

(56) References Cited

U.S. PATENT DOCUMENTS 9,455,909 B2    9/2016  Parla et al.
2013/0111040 A1*  5/2013  Vempati ................ H04L 63/029
                                                        709/227

2014/0344917 A1*  11/2014  Parla .................... H04L 63/0272
                                                        709/245
2018/0309658 A1*  10/2018  Parla ........................ H04L 45/54
2019/0334864 A1*  10/2019  Yin ......................... H04L 63/029

(Continued)

FOREIGN PATENT DOCUMENTS

WO   WO-2021146311 A1 *  7/2021  ......... H04L 12/4633

OTHER PUBLICATIONS

International Search Report and Written Opinion for Application No. PCT/US2023/062010, dated Apr. 5, 2023, 16 pages.

(Continued)

*Primary Examiner* — Jeffrey R Swearingen

(57) ABSTRACT

A method may include obtaining Domain Name System (DNS) configuration policies, that indicate how to direct a DNS query based on various Internet Protocol (IP) addresses or Fully Qualified Domain Names (FQDNs). The method may include obtaining a DNS query request on a first interface adapter in which the DNS query request is obtained from a DNS client and directed toward a particular FQDN. The method may include determining whether the particular FQDN included with the DNS query request is included in the DNS configuration policies and directing the DNS query request to an alternative DNS destination responsive to determining that the particular FQDN is not included in the DNS configuration policies. The method may include generating, at the alternative DNS destination, a DNS response that includes an error code, injecting the DNS response into a Transport Control Protocol (TCP)/IP stack, and sending the DNS response to the DNS client.

20 Claims, 9 Drawing Sheets

(56) References Cited

U.S. PATENT DOCUMENTS

| | | | | |
|---|---|---|---|---|
| 2019/0372937 A1* | 12/2019 | Song | ............... | H04L 63/0227 |
| 2020/0304459 A1* | 9/2020 | Konda, Jr. | ............ | H04L 63/126 |
| 2021/0344651 A1* | 11/2021 | Joshi | ............... | H04L 12/4633 |
| 2023/0108854 A1* | 4/2023 | Namdev | ............ | H04L 61/2525 |
| | | | | 726/15 |

OTHER PUBLICATIONS

Savolainen, T., et al., "Improved Recursive DNS Server Selection for Multi-Interfaced Nodes," IETF, Dec. 2012, 30 pages.

* cited by examiner

```
Policy configuration structures:
            typedef struct _includepolicy_{
                    PreferredInterface ip,
                    Listof FQDNs,
                    ListofDNSservers
            } includepolicy;                    ⟵ 508 typedef struct _excludepolicy_{
                    PreferredInterface ip,
                    Listof FQDNs,
                    ListofDNSservers
            } excludepolicy;                    ⟵ 510 typedef struct _defaultpolicy_{
                    PreferredInterface ip,
                    ListofDNSservers
            } defaultpolicy;                    ⟵ 512

Includepolicy  = {1.2.3.4, "*.ivanti.com" "*.pulsesecure.net", 7.7.7.7}
      Excludepolicy  = {5.6.7.8, "*.facebook.com", 8.8.8.8}
516⟶  Defaultpolicy  = {10.1.2.3, 8.8.4.4}      ⟵ 514
      Local UDP server (DR) running on loopback 127.0.0.1:51638    500
```

```
DNS query:
        FQDN: "www.ivanti.com"
        local ip(interface ip): "10.1.2.3"
        remote ip(DNS server): "8.8.4.4"
        remote port: 53                     502
```

```
Modified DNS query
        FQDN: "www.ivanti.com"
        local ip(interface ip): "10.1.2.3"
        remote ip(DNS server): "127.0.0.1"
        remote port: 51638                  504
```

```
DNS Error Response:
    518⟶  FQDN: "www.ivanti.com"
           local ip(interface ip): "10.1.2.3"
           remote ip(DNS server): "127.0.0.1"
           Answer: (1) - FormatERROR
```
```
    520⟶  FQDN: "www.ivanti.com"
           local ip(interface ip): "10.1.2.3"
           remote ip(DNS server): "8.8.4.4"
           Answer: (1) - FormatERROR        506
```

FIG. 5

MULTIPLE NETWORK INTERFACE DNS QUERY ROUTING

CROSS REFERENCE TO RELATED APPLICATION

This application claims priority to and the benefit of Indian Provisional Patent Application No. 202211006251, filed Feb. 5, 2022, which is incorporated herein in its entirety.

FIELD

The present disclosure generally relates to routing Domain Name System (DNS) queries to or from multiple network interfaces.

BACKGROUND

Virtual Private Networks (VPNs) may establish virtual point-to-point connections between two or more private computer networks. The VPN may facilitate sending or receiving data shared across a public computer network (i.e., the Internet) as if computing devices operating on the connected private computer networks are part of the same private computer network. Because VPNs may secure communications between two or more computing devices operating on separate private computer networks, VPNs may improve the security and functionality of communications between private networks that are remote with respect to one another.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include obtaining Domain Name System (DNS) configuration policies, that indicate how to direct a DNS query based on various Internet Protocol (IP) addresses or Fully Qualified Domain Names (FQDNs). The method may include obtaining a DNS query request on a first interface adapter in which the DNS query request is obtained from a DNS client and directed toward a particular FQDN. The method may include determining whether the particular FQDN included with the DNS query request is included in the DNS configuration policies and directing the DNS query request to an alternative DNS destination responsive to determining that the particular FQDN is not included in the DNS configuration policies. The method may include generating, at the alternative DNS destination, a DNS response that includes an error code, injecting the DNS response into a Transport Control Protocol (TCP)/IP stack, and sending the DNS response to the DNS client.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which:

FIG. 5 in which some example pseudo instructions that may be implemented in the computer network environment of FIG. 2;

DETAILED DESCRIPTION

Figure 1:
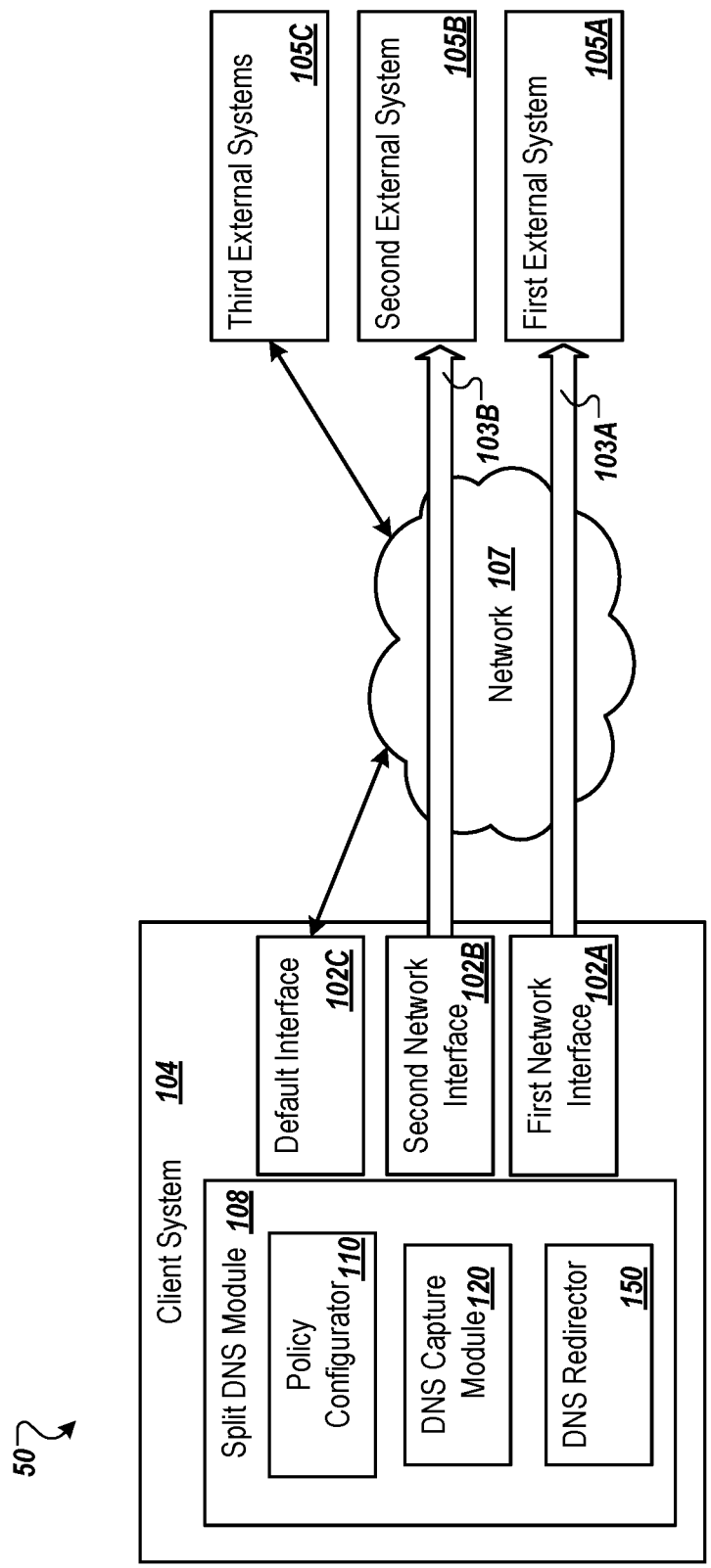
FIG. 1 depicts an example operating environment in which some embodiments of the present disclosure may be implemented.

A user of a computing device operating on a private computer network may use a virtual private network (VPN) to securely communicate data with another private computer network that is separate from the private computer network on which the user's computing device is operating. Data communication via the VPN may protect sensitive data being sent between the two private computer networks. In situations in which the user's computing device communicates with other computer networks, the VPN may route data being sent from the user's computing device operating on the private computer network to the second private computer network, and the second private computer network may forward the communicated data from the user's computing device to the intended destination.

In some instances, however, some of the data being communicated via the VPN may not include sensitive or important information, and as such, the data that does not include sensitive or important information may not need to be communicated between private computer networks via the VPN. The user may choose to turn on the VPN when the user wants to send or receive data that includes important information and turn off the VPN for data communications that do not include important information to reduce the amount of data traffic passing through the VPN and the connected private computer networks. However, constantly turning on and off the VPN may be time-consuming because each attempt to connect to the VPN may take some amount of time for verification, authentication, or connection of the user's computing device or private computer network with the VPN. Additionally or alternatively, data communications may generally become more inefficient or insecure because the user may forget to connect to the VPN before sending or receiving sensitive data or forget to disconnect from the VPN before sending or receiving ordinary data.

Implementing a VPN split tunneling process may improve routing of data traffic through the VPN. The VPN split tunneling process typically includes sending Domain Name System (DNS) queries from a first user device to a user mode service. The DNS queries routed to the user mode service are analyzed to determine whether a domain name corresponding to each of the DNS queries is configured as part of a configuration policy implemented on the user mode service. Responsive to determining that a particular domain name associated with a particular DNS query is included in the configuration policy, the particular DNS query may be blocked and redirected to a VPN server for soliciting a DNS response to the particular DNS query. The VPN server may send the DNS response to the user mode service, and the user mode service may generate a second DNS response based on the DNS response received from the VPN server that is then sent to a local loopback adapter. The second DNS response may then be routed to its intended destination by the local loopback adapter, which may often be the first user device that initially sent the particular DNS query that is related to the second DNS response. However, VPN split tunneling may route DNS queries incorrectly in situations with multiple network interfaces configured to the same private computer network, and existing VPN split tunneling processes may route DNS queries to unintended network interfaces or unintended DNS servers.

The present disclosure relates to, among other things, a method and a system of VPN split tunneling that more accurately redirects DNS queries to their intended network interfaces or DNS servers. The DNS queries may be parsed and handled at a system component layer according to configuration policies pushed when the VPN connection is first established. In some embodiments, one or more system component extensions may be implemented to route DNS queries to their intended network interfaces as described in further detail in relation to the descriptions of the figures. Ensuring DNS query requests are sent on the intended network interfaces to obtain the intended IP addresses may reduce DNS loads on a VPN server because only DNS queries that adhere to a network configuration policy list may be sent to the VPN server. As such VPN split tunneling according to one or more embodiments of the present disclosure may improve the accuracy and reliability of DNS query routing, which in turn improves the security and efficiency of using VPNs.

These and other embodiments are described with reference to the appended Figures in which like item number indicates like function and structure unless described otherwise. The configurations of the present systems and methods, as generally described and illustrated in the Figures herein, may be arranged and designed in different configurations. Thus, the following detailed description of the Figures, is not intended to limit the scope of the systems and methods, as claimed, but is merely representative of example configurations of the systems and methods.

FIG. 1 depicts an example operating environment 50 in which some embodiments of the present disclosure may be implemented. The operating environment 50 includes a client system 104 that may communicate with external systems 105A-105C (generally external system or external systems 105) via a network 107. The client system 104 may establish one or more VPN tunnels 103A and 103B with one or more of the external systems 105. Data traffic may be communicated via the VPN tunnels 103, which may improve security relative to the data traffic.

The network 107 may include any communication network configured for communication of signals between the components (e.g., 104 and 105) of the operating environment 50. The network 107 may be wired or wireless. The network 107 may have configurations including a star configuration, a token ring configuration, or another suitable configuration. Furthermore, the network 107 may include a local area network (LAN), a wide area network (WAN) (e.g., the Internet), and/or other interconnected data paths across which multiple devices may communicate. In some embodiments, the network 107 may include a peer-to-peer network. The network 107 may also be coupled to or include portions of a telecommunications network that may enable communication of data in a variety of different communication protocols. The data communicated in the network 107 may include data communicated via short messaging service (SMS), multimedia messaging service (MMS), hypertext transfer protocol (HTTP), direct data connection, wireless application protocol (WAP), or any other protocol that may be implemented in the components of the operating environment 50.

The client system 104 includes two or more network interfaces 102A-102C, a portion of which may support or establish the VPN tunnels 103A and 103B (generally, VPN tunnel or VPN tunnels 103). A first portion of data traffic communicated in the operating environment 50 may be routed through the VNP tunnels. Additionally, a second portion of the data traffic may be communicated via a default interface 102C, which may communicate via a public portion of the network 107.

In some conventional client systems including multiple network interfaces (e.g., the network interfaces 102), DNS queries may be communicated via incorrect or unintended network interfaces or to unintended DNS servers. Some embodiments of the present disclosure address this problem. For instance, the client system 104 may implement a split DNS module 108 to direct the DNS queries through a correct or a preferred network interface and to correct DNS servers.

The split DNS module 108 may use a configuration policy that is set during a VPN connection. The configuration policy may be used to delegate DNS queries to one of the network interfaces 102. In general, the split DNS module 108 may intercept DNS queries at the system component layer of an operating system of the client system 104. Based on the configuration policy, the split DNS module 108 may decide on either passing the DNS query without modification (e.g., if the DNS query is routed according to a default policy or if the DNS query is directed to the preferred network interface or if the DNS query request is directed to a preferred network interface 102). Alternatively, the DNS query request may be redirected to a local UDP server, which may run in loopback to send a DNS error response back to a DNS client from which the DNS query originated.

The DNS error response may trigger a subsequent DNS query request on a different network interface. The split DNS module 108 may repeat these operations until one of the subsequent DNS query lands on the preferred network interface 102. In some embodiments, the split DNS module 108 may parsed and handled at system component layer of the client system 104 and redirect the DNS queries to the local UDP server. Accordingly, the DNS query may be redirected to the preferred network interface with little or immaterial delays.

The split DNS module 108 of FIG. 1 may include a policy configurator 110, a DNS capture module 120, and a DNS redirector 150. The policy configurator 110 is configured to push the configuration policy to the DNS capture module 120. The policy configurator 110 may push the configuration policy to the DNS capture module 120 at the time of connection to one of the VPN tunnels 103. The configuration policy may include a list of FQDN include/exclude policies along with a map of preferred network interface and DNS servers. The configuration policy may also include a default policy used for redirecting the queries to one of the network interfaces 102 if the FQDN include/exclude policies does not match a DNS query.

The DNS capture module 120 is configured to interpret the internet traffic coming in and going out of the client system 104. When a DNS query for a FQDN is received by the DNS capture module 120, the DNS query is parsed and FQDN pattern matching is applied against the configuration policy list. If the FQDN matches an FQDN of the include/exclude policy and is on the preferred network interface (e.g., a virtual adapter (VA)) with preferred DNS server as remote, then the DNS query is allowed through the interface and no DNS redirection happens. If the FQDN of the DNS query matches an FQDN of the include/exclude policy and is not on the correct interface with preferred DNS server as remote, then the DNS query is modified to be sent to the DNS redirector 150, which may be listening to a local loopback socket. Essentially, the DNS redirector 150 acts as a local DNS server.

The DNS redirector 150 (e.g., a local UDP server) listening on a loopback socket may generate and send a DNS response with an error code. DNS redirector 150 generates a dummy DNS response with the error code and sends it to a DNS client that generated to original DNS query.

When the DNS client receives the DNS error response, by default it generates a subsequent DNS query targeted through a different one of the network interfaces. Again the DNS capture module 120 interprets the subsequent DNS query and repeats the process until the DNS client generates a query targeted for the preferred interface.

By handling the DNS queries, the DNS capture module 120 controls the communication of DNS queries on only the preferred network interfaces 102 instead of relying on remote VPN server response errors. Accordingly, the split DNS module 108 reduces the DNS load on VPN servers by sending only the DNS queries matching the configuration policy. Additionally, the split DNS module 108 help obtain geo proximal IP addresses for "non-include" resources at the external systems 105 even if the resources are connected to one of the VPN tunnels 103.

The split DNS module 108 and components thereof may be implemented using hardware including a processor, a microprocessor (e.g., to perform or control performance of one or more operations), a field-programmable gate array (FPGA), or an application-specific integrated circuit (ASIC). In some other instances, the split DNS module 108 and components thereof may be implemented using a combination of hardware and software. Implementation in software may include rapid activation and deactivation of one or more transistors or transistor elements such as may be included in hardware of a computing system (e.g., the client system 104 of FIG. 1). Additionally, software defined instructions may operate on information within transistor elements. Implementation of software instructions may at least temporarily reconfigure electronic pathways and transform computing hardware.

Modifications, additions, or omissions may be made to the operating environment 50 without departing from the scope of the present disclosure. For example, the operating environment 50 may include one or more client systems 104, external systems 105, or any combination thereof. Moreover, the separation of various components and devices in the embodiments described herein is not meant to indicate that the separation occurs in all embodiments. Moreover, it may be understood with the benefit of this disclosure that the described components and servers may generally be integrated together in a single component or server or separated into multiple components or servers.

Figure 2:
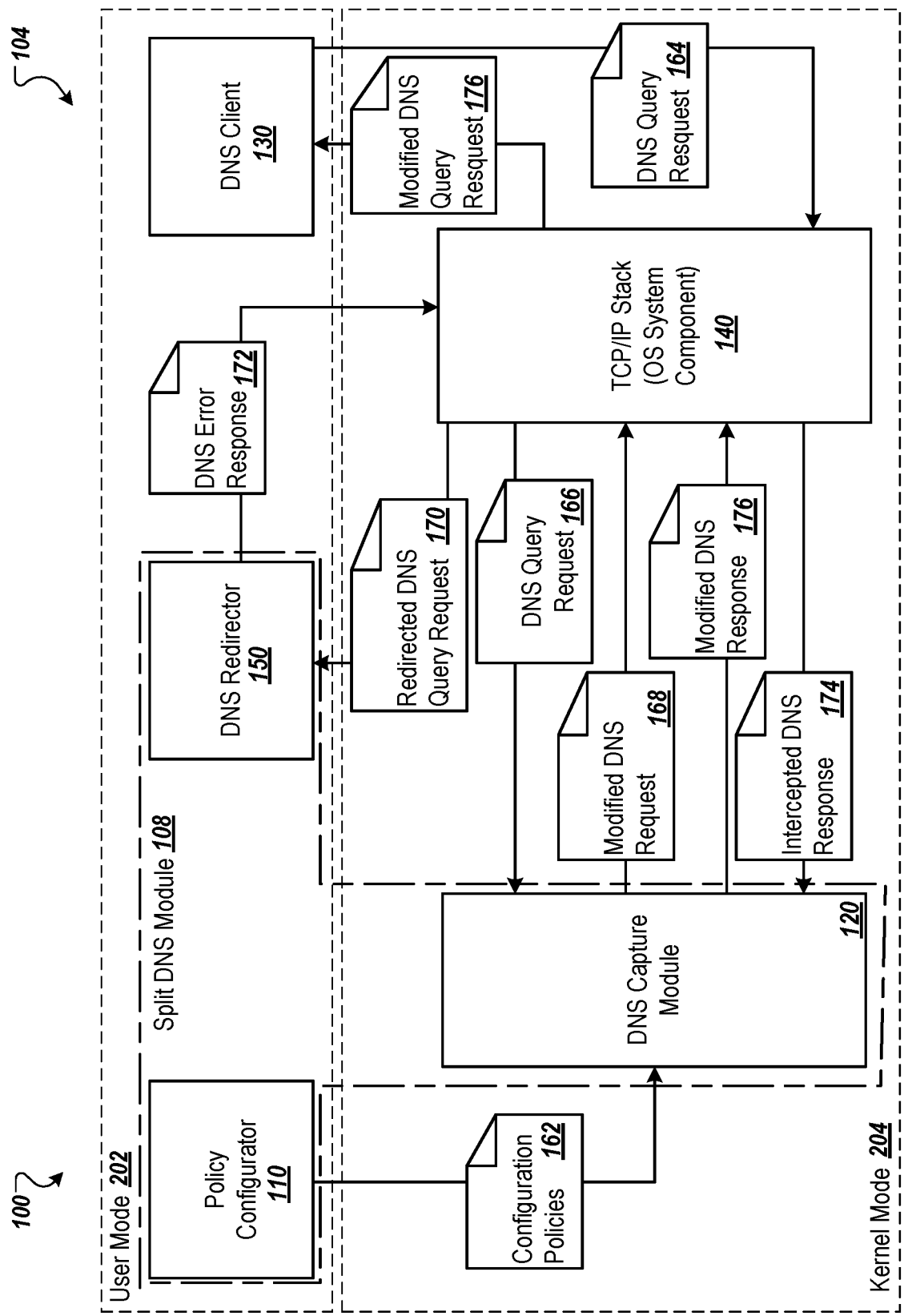
FIG. 2 illustrates an example computer network environment configured to route DNS queries.

FIG. 2 illustrates an example computer network environment 100 configured to route DNS queries in accordance with at least one embodiment of the present disclosure. In some embodiments, the computer network environment 100 may be included in the client system 104 of FIG. 1. The computer network environment 100 may include the policy configurator 110. The policy configurator is configured to push configuration policies 162 relating to FQDNs to a DNS capture module 120. The configuration policies 162 may include a list of FQDNs and one or more rules or guidelines relating to the FQDNs. For example, a particular configuration policy 162 may be an inclusion policy that specifies one or more IP addresses or FQDNs to which DNS queries to be directed. The DNS queries directed to an IP address or a FQDN specified in an inclusion policy may be routed through a VPN tunnel. The particular configuration policy 162 may also include an exclusion policy that specifies IP addresses or FQDNs not be routed through the VPN tunnel and sent to the intended destination via public or conventional data communication processes. The particular configuration policy 162 may also include a default policy that specifies how to route DNS queries that are not directed toward an IP address or a FQDN not mentioned in the inclusion policies or exclusion policies. Additionally or alternatively, the configuration policies 162 may specify that a particular FQDN is included or excluded from VPN tunneling depending on whether the particular FQDN is paired with a particular virtual network interface adapter.

A DNS client 130 is configured to generate DNS query requests, such as the DNS query request 164. The DNS query request 164 may resolve a remote host's domain name into an IP address corresponding to the remote host. The DNS client 130 may communicate with a DNS server by sending DNS query requests to the DNS server and receiving DNS responses with the IP address of a requested remote host. In some embodiments, the DNS client 130 may send the DNS query request 164 to a Transport Control Protocol (TCP)/IP stack 140, which is representative of an OS component of the client system. The TCP/IP stack 140 includes a set of communication protocols for directing communications between various computer networks. Sending the DNS query request 164 to the TCP/IP stack 140 may facilitate sending the DNS query request 164 to a recipient computer network.

In some embodiments, the DNS query request 164 sent to the TCP/IP stack 140 may be intercepted as an intercepted DNS query request 166 by the DNS capture module 120. The DNS capture module 120 may determine whether a FQDN included with the intercepted DNS query request 166 is mentioned in the configuration policies 162 pushed to the DNS capture module 120. The DNS capture module 120 may further determine whether the FQDN of DNS query request is associated with a preferred IP address specified in the configuration policy 162.

Responsive to a determination that the FQDN of the intercepted DNS query request 166 is not included in the configuration policies 162, the DNS query request 164 may be routed according to the default policy of the configuration policy 162. Responsive to a determination that the FQDN of the intercepted DNS query request 166 is included in the configuration policies 162 and associated with the preferred IP address of the configuration policy 162, the DNS capture module 120 may route the DNS query request 166 without modification. For example, the DNS capture module 120 may determine that a FQDN of the intercepted DNS query request 166 matches a FQDN of an inclusion policy or an exclusion policy previously pushed to the DNS capture module 120 and that it is associated with the preferred IP address. In this and other situations, the DNS capture module 120 may reinject the intercepted DNS query request 166 into the TCP/IP stack 140 such that DNS query request is allowed through the network interface and no DNS redirection occurs.

Responsive to a determination that the FQDN of the intercepted DNS query request 166 is included in the configuration policies 162 but not associated with the preferred IP address of the configuration policy 162, the DNS capture module 120 may direct the intercepted DNS query request 166 to an alternative DNS destination rather than the intended destination of the intercepted DNS query request 166. For example, redirecting the intercepted DNS query request 166 to the alternative DNS destination may include modifying the intercepted DNS query request 166 to generate a modified DNS request 168 that includes a DNS query destined for a DNS redirector 150, which may include a preconfigured local User Datagram Protocol (UDP) server.

For example, the intercepted DNS query request 166 may have a FQDN of "www.example.com" with a corresponding local network interface IP address of "10.1.2.3". The intercepted DNS query request 166 may include a remote DNS server IP address (e.g., the intended destination of the intercepted DNS query request 166) of "8.8.4.4" and an associated remote port 53. The DNS capture module 120 may change the intended destination of the intercepted DNS query request 166 by modifying the remote DNS server IP address and the associated remote port such that the intercepted DNS query request 166 is now directed to the DNS redirector 150. In this and other examples, the DNS redirector 150 may have a particular IP address (e.g., 127.0.0.1) at a particular port (e.g., 51638), and the modified DNS request 168 may be directed to the remote DNS server IP address and the remote port corresponding to the IP address and port of the DNS redirector 150. As such, the remote DNS server IP address of "8.8.4.4" of the intercepted DNS query request 166 may be replaced with the IP address "127.0.0.1" in the modified DNS request 168. The remote port of the intercepted DNS query request 166 (port 53) may be replaced with the remote port 56138 in the modified DNS request 168.

The modified DNS request 168 generated by the DNS capture module 120 may be reinjected into the TCP/IP stack 140 such that the modified DNS request 168 is routed to its destination, the DNS redirector 150, as a redirected DNS query request 170.

In some embodiments, the DNS redirector 150 may be configured to return the DNS error response 172 that includes an error code to the TCP/IP stack 140. The DNS error response 172 may be a dummy DNS response that is configured to include the error code such that the DNS client 130 receives an invalid DNS response.

In these and other embodiments, the error code may include typical error codes related to failed DNS queries, such as query format errors (e.g., "FormErr (1)"), failures of a requested server (e.g., "ServFail (2)"), queries requesting non-existent domains (e.g., "NXDomain (3)"), queries requesting domains that are not implemented (e.g., "NotImp (4)"), and query refusals (e.g., "Refused (5)").

The DNS error response 172 may communicate the DNS error response 172 to the TCP/IP stack 140. The DNS capture module 120 may intercept the DNS error response 172 as an intercepted DNS response 174 before the TCP/IP stack 140 routes the DNS error response 172 to the DNS client 130. The DNS capture module 120 may modify the intercepted DNS response 174 and reinject a modified DNS response 176 into the TCP/IP stack 140.

In some embodiments, the intercepted DNS response 174 may include the local network interface IP address and/or the local FQDN of the DNS query request 164. Additionally or alternatively, the intercepted DNS response 174 may include a remote DNS server IP address that matches the remote DNS server IP address of the modified DNS request 168. In these and other embodiments, modification of the intercepted DNS response 174 may include changing the remote DNS server IP address of the intercepted DNS response 174 from the IP address of the DNS redirector 150 to the original IP address of the DNS query request 164 based on the local FQDN, the local network interface IP address, or the remote DNS server IP address of the intercepted DNS response 174, which may or may not match the respective IP addresses or FQDNs included in a corresponding DNS query request.

Returning to the previous example, the intercepted DNS response 174 may include a remote DNS server IP address of "127.0.0.1", and the DNS capture module 120 may modify the destination IP address of the intercepted DNS response 174 to the original remote DNS server IP address of the intercepted DNS query request 166 of "8.8.4.4" and reinject the modified DNS response 176 including the modified destination IP address to the TCP/IP stack 140.

The modified DNS response 176 may be sent to the DNS client 130 that originally sent the DNS query request 164 to the TCP/IP stack 140. The TCP/IP stack 140 may facilitate responding to the DNS query request 164 from the DNS client 130 with the modified DNS response 176. In some embodiments, the DNS client 130 may parse the modified DNS response 176 and determine that the modified DNS response 176 includes the error code. In response, the DNS client 130 may generate a subsequent DNS query request targeted to a different network interface and send the subsequent DNS query request to the TCP/IP stack 140 for resolution.

In FIG. 2, the policy configurator, the DNS redirector 150, and the DNS client 130 may be included in a user mode 202 of the client system. Additionally, the DNS capture module 120 and the TCP/IP stack 140 may be included in a kernel mode 204 of the client system. Inclusion of the DNS capture module 120 in the kernel mode 204 may enable system-level evaluation and routing of DNS queries.

Figure 3:
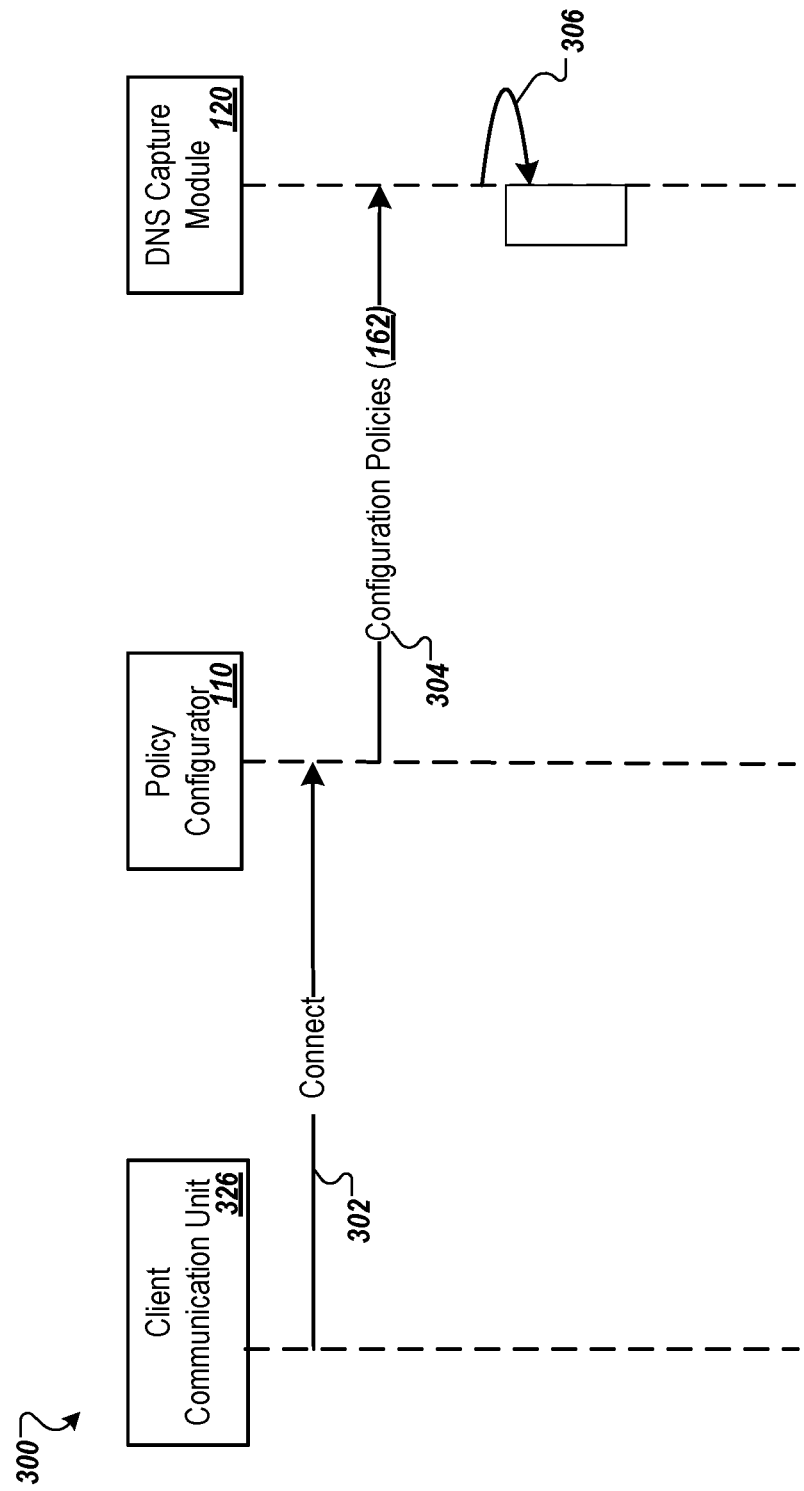
FIG. 3 depicts an initialization sequence diagram that may be implemented in the computer network environment of FIG. 2.
Figure 4:
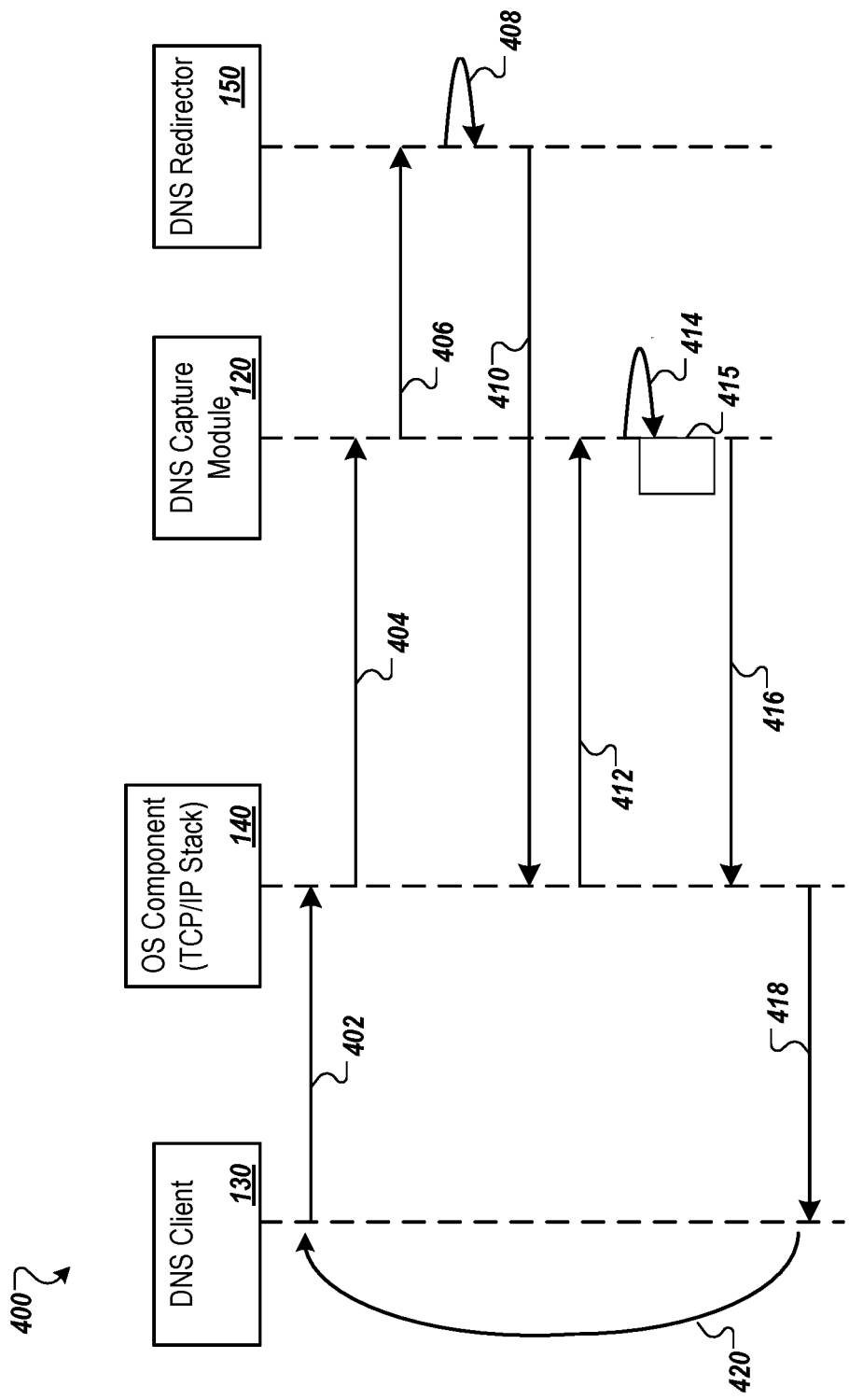
FIG. 4 depicts an operation sequence diagram that may be implemented in the computer network environment of FIG. 2.

FIG. 3 depicts an initialization sequence diagram 300 and FIG. 4 depicts an operation sequence diagram 400 that may be implemented in the operating environment 50 of FIG. 1. In some embodiments, the initialization sequence diagram 300 occurs prior to the operation sequence diagram 400. FIGS. 3 and 4 are described with FIG. 5 in which some example pseudo instructions 500, 502, 504, and 506 (collectively, instructions 500-506) are depicted. The instruction 500-506 may be implemented in the operating environment 50 of FIG. 1 during performance of an operation represented by one or both of the sequence diagrams 300 and 400. The instructions 500-506 are example instructions configured to depict changes in one or more embodiments described in the present disclosure. The instructions 500-506 may not represent actual instructions implemented in all embodiments or circumstances. One with skill in the art may recognize with the benefit of the present disclosure modifications involved in adapting the instructions 500-506 to a particular environment or operation.

With reference to FIGS. 3 and 5, the initialization sequence diagram 300 represents initialization operations in which a configuration policy (e.g., the configuration policy 162) may be used to update internal data structures implemented in one or more embodiments of DNS query routing such as those depicted in FIGS. 4, 7, and 8A-8B.

The initialization sequence diagram 300 includes a client communication unit 326, the policy configurator 110, and the DNS capture module 120, which are described elsewhere in the present disclosure. The client communication unit 326 may correspond or be substantially similar to the communication unit 614 described with reference to FIG. 6. The client communication unit 326 may connect (302) to a VPN tunnel such as the VPN tunnel 103 implemented in the network 107 of FIG. 1 or some portion thereof. A VPN connection established between the client communication unit 326 may enable data and information communication via a VPN tunnel to one or more external systems such as the external systems 105 of FIG. 1.

The policy configurator 110 may receive an indication of the connection established by the client communication unit 326. For instance, the client communication unit 326 may communicate data indicative of the connection, or the policy configurator 110 may otherwise access status of a network connections in a client system.

Responsive to the connection, the policy configurator 110 may communicate or push (304) a configuration policy such as the configuration policy 162 to the DNS capture module 120. In some embodiments, the policy configurator 110 may be included in the user mode of the client system and the DNS capture module 120 may be located on the kernel mode of the client system. Accordingly, the policy configurator 110 may push the configuration policy to the kernel mode from the user mode.

Referring to FIG. 5, a first pseudo instruction 500 may include policy configuration structures of an example of a configuration policy. The first pseudo instruction 500 includes a structure of an include policy 508, which may indicate FXDNs that are routed via one of the multiple VPN adapters; a structure of an exclude policy 510, which may indicate FXDNs that are not routed via a VPN adapter; and a structure of a default policy 512. In addition, the first pseudo instruction 500 includes IP addresses of preferred VPN adapters and a list of FQDNs associated with each of the preferred VPN adaptors for the include policy and the exclude policy as well as IP addresses of the default policy. The IP addresses and FQDNs are generally indicated at 514. In addition, the first pseudo instruction 500 includes the IP address and port of DNS redirector such as the DNS redirector 150. The IP address and port of the DNS redirector is generally indicated at 516. The configuration policy pushed from the policy configuration 110 to the DNS capture module 120 may be formatted according to the first pseudo instruction 500 or a similar structure.

Referring to FIG. 3, the DNS capture module 120 may update (306) internal data structures using the configuration policy. After the internal data structures are update, the DNS capture module 120 may be prepared for DNS query routing.

The operation sequence diagram 400 includes the DNS client 130, the OS component 140, the DNS capture module 120, and the DNS redirector 150. The operation of the DNS routing may begin by the DNS client 130 communicating (402) a DNS query request to the OS component 140. Referring to FIG. 5, the DNS query request may be formatted according to a second pseudo instruction 502. In the second pseudo instruction 502, the DNS query includes a FQDN, a local IP address, a remote IP address to which the DNS query is directed, and a remote port.

The DNS capture module 120 may intercept (404) the DNS query request. The DNS capture module 120 may then analyze the intercepted DNS query request to determine whether the FQDN of the DNS query is included in the list of FQDNs of the configuration policy. If the FQDN of the DNS query is included in the list of FQDNs, the DNS capture module 120 may further determine whether the remote IP address is the preferred IP address associated with the FQDN in the configuration policy. Three options may occur at this point. First, if the FQDN of the DNS query is not included in the list of FQDNs, then the DNS query may be routed according to the default policy (not shown in FIG. 4). Second, if the FQDN of the DNS query is included in the list of FQDNs and the remote IP address is the preferred IP address associated with the FQDN in the configuration policy, then the DNS query may be routed to the remote IP address without modification (not shown in FIG. 4). Third, if the FQDN of the DNS query is included in the list of FQDNs, but the remote IP address is not the preferred IP address associated with the FQDN in the configuration policy, then the DNS capture module 120 may generate a modified DNS query and communicate (406) the modified DNS query to the DNS redirector 150.

Referring to FIG. 5, a third pseudo instruction 504 depicts an example of a modified DNS query. In the modified DNS query, the remote IP address and the remote port is modified to the IP address and the remote port of the DNS redirector 150, which corresponds to the redirector information 516. In some embodiments, the modified DNS query may also include a transaction identifier. In these embodiments, the transaction identifier may be added to the modified remote IP address. For instance, the modified remote IP address may be formatted as <TxID, DNS redirector IP address>, in which TxID represents the transaction identifier.

In FIG. 4, the DNS redirector 150 may generate (408) a DNS error response and communicate (410) to the OS component 140. In FIG. 5, a fourth pseudo instruction 506 depicts an example of the DNS error response. A first DNS error response 518 may include an error code as an answer. The first DNS error response 518 may be communicated to the OS component 140.

In FIG. 4, the DNS capture module may intercept (412) the DNS error response from the OS component 140. The DNS error response may determine whether the intercepted DNS error response originated at the DNS redirector 150. In response, the DNS capture module may modify (415) the remote IP address of the DNS error response from the IP address of the DNS redirector 150 back to the IP remote address of the DNS query. In FIG. 5, the fourth pseudo instruction 506 depicts a second DNS error response 520 that illustrates the modification of the IP address of the DNS redirector 150 back to the IP remote address of the DNS query. In embodiments including the transaction identifier, the transaction identifier may remain in the DNS error response. The DNS capture module may reinject (414) the DNS error response and communicate (416) to the OS component 140. The DNS error response may then be communicated (418) to the DNS client 130.

The DNS client 130 may generate (420) a subsequent DNS query. The subsequent DNS query may include the FQDN and the local IP address of the previously communicated DNS query. The DNS client 130 may change the remote IP address and remote port to another VPN adapter. The subsequent DNS query may then be communicated (402) to the OS component 140 and the process may begin again. This process may occur multiple times until the remote IP address and remote port matches the preferred IP address of the configuration policy.

Figure 6:
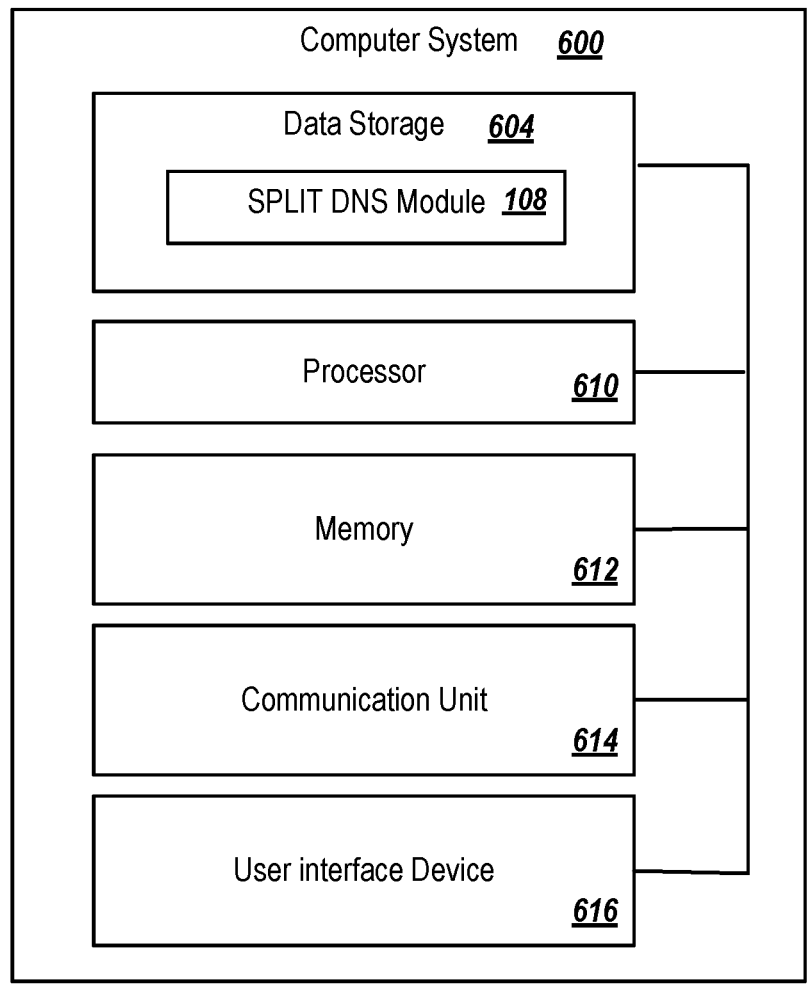
FIG. 6 illustrates an example computer system configured for DNS query routing in a client system having multiple network interfaces.

FIG. 6 illustrates an example computer system 600 configured for DNS query routing in a client system having multiple network interfaces, according to at least one embodiment of the present disclosure. The computer system 600 may be implemented in the operating environment 50 FIG. 1, for instance. Examples of the computer system 600 may include the client system 104. The computer system 600 may include one or more processors 610, a memory 612, a communication unit 614, a user interface device 616, and a data storage 604 that includes the split DNS module 108.

The processor 610 may include any suitable special-purpose or general-purpose computer, computing entity, or processing device including various computer hardware or software modules and may be configured to execute instructions stored on any applicable computer-readable storage media. For example, the processor 610 may include a microprocessor, a microcontroller, a digital signal processor (DSP), an ASIC, an FPGA, or any other digital or analog circuitry configured to interpret and/or to execute program instructions and/or to process data. Although illustrated as a single processor in FIG. 6, the processor 610 may more generally include any number of processors configured to perform individually or collectively any number of operations described in the present disclosure. Additionally, one or more of the processors 610 may be present on one or more different electronic devices or computing systems. In some embodiments, the processor 610 may interpret and/or execute program instructions and/or process data stored in the memory 612, the data storage 604, or the memory 612 and the data storage 604. In some embodiments, the processor 610 may fetch program instructions from the data storage 604 and load the program instructions in the memory 612. After the program instructions are loaded into the memory 612, the processor 610 may execute the program instructions.

The memory 612 and the data storage 604 may include computer-readable storage media for carrying or having computer-executable instructions or data structures stored thereon. Such computer-readable storage media may include any available media that may be accessed by a general-purpose or special-purpose computer, such as the processor 610. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 610 to perform a certain operation or group of operations.

The communication unit 614 may include one or more pieces of hardware configured to receive and send communications. In some embodiments, the communication unit 614 may include one or more of an antenna, a wired port, and modulation/demodulation hardware, among other communication hardware devices. In particular, the communication unit 614 may be configured to receive a communication from outside the computer system 600 and to present the communication to the processor 610 or to send a communication from the processor 610 to another device or network (e.g., the network 107 of FIG. 1).

The user interface device 616 may include one or more pieces of hardware configured to receive input from and/or provide output to a user. In some embodiments, the user interface device 616 may include one or more of a speaker, a microphone, a display, a keyboard, a touch screen, or a holographic projection, among other hardware devices.

The split DNS module 108 may include program instructions stored in the data storage 604. The processor 610 may be configured to load the split DNS module 108 into the memory 612 and execute the split DNS module 108. Alternatively, the processor 610 may execute the split DNS module 108 line-by-line from the data storage 604 without loading them into the memory 612. When executing the split DNS module 108, the processor 610 may be configured to perform one or more processes or operations described elsewhere in this disclosure.

Modifications, additions, or omissions may be made to the computer system 600 without departing from the scope of the present disclosure. For example, in some embodiments, the computer system 600 may not include the user interface device 616. In some embodiments, the different components of the computer system 600 may be physically separate and may be communicatively coupled via any suitable mechanism. For example, the data storage 604 may be part of a storage device that is separate from a device, which includes the processor 610, the memory 612, and the communication unit 614, that is communicatively coupled to the storage device. The embodiments described herein may include the use of a special-purpose or general-purpose computer including various computer hardware or software modules, as discussed in greater detail below.

Figure 7:
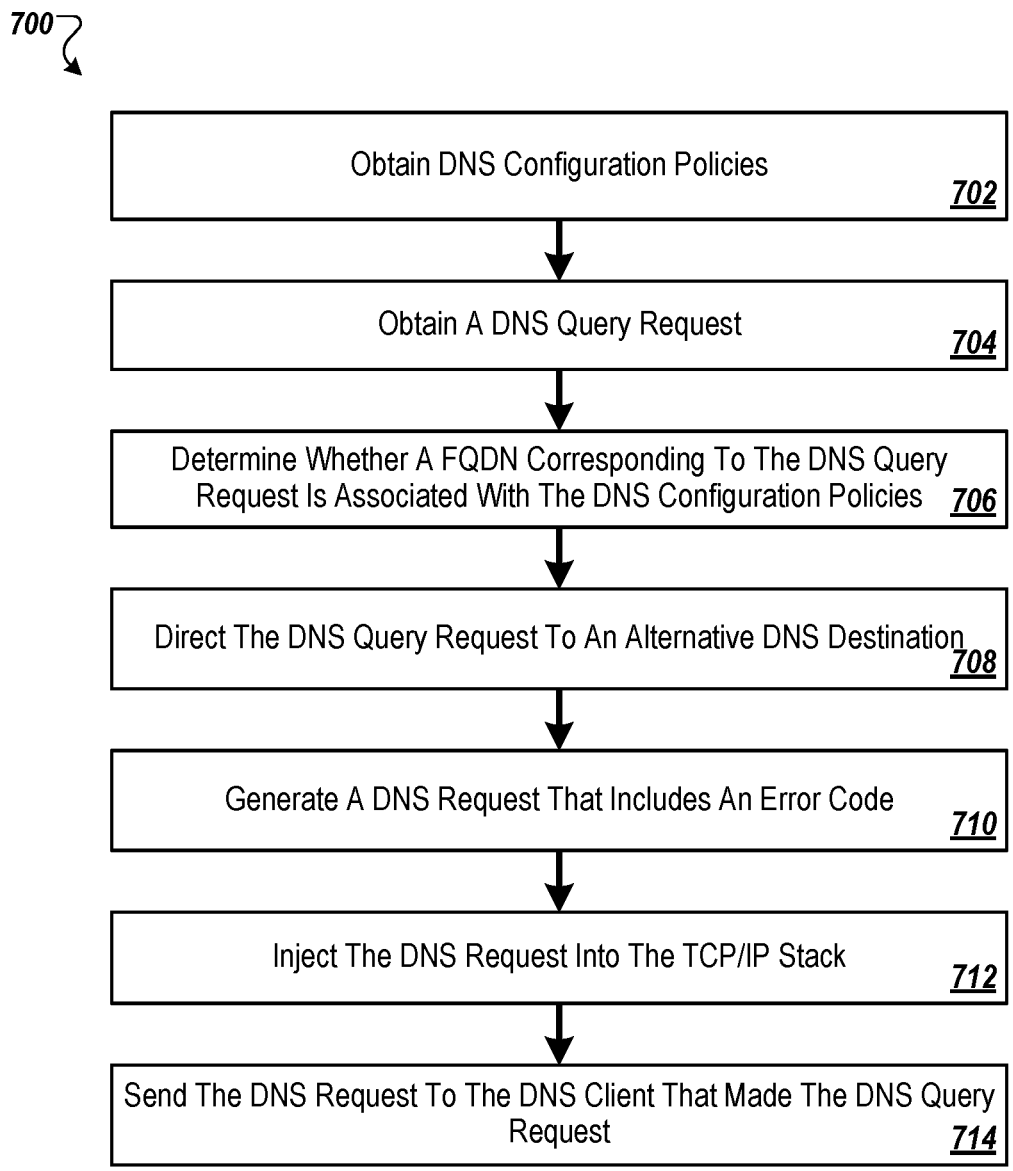
FIG. 7 is a flowchart of an example method of routing DNS queries.

FIG. 7 is a flowchart of an example method 700 of routing DNS queries in accordance with at least one embodiment of the present disclosure. The method 700 may be implemented in client systems having multiple network interfaces or multiple VPN adapters. The method 700 may begin at block 702 in which one or more DNS configuration policies may be obtained. The DNS configuration policies may indicate how to direct a DNS query request according to one or more IP addresses and/or FQDNs included in the DNS query request. For example, a particular DNS configuration policy may include an inclusion policy and an exclusion policy. The inclusion policy indicates particular IP addresses or FQDNs that are routed as VPN traffic. The exclusion policy indicates particular IP addresses or FQDNs that are routed as outside a VPN tunnel or as ordinary data traffic.

The configuration policy may also include a default policy. The default policy may be implemented in response to a determination that a DNS query request does not include an IP address or a FQDN that is specified by the inclusion or the exclusion policies. For example, the default policy may specify that a DNS query request not routed according to the inclusion or the exclusion policies is routed as VPN traffic. As another example, the default policy may specify that a DNS query request is rejected and sent back to the DNS client.

At block 704, a DNS query request may be obtained. The DNS query request may be obtained on a first network interface adapter. The DNS query request may include a source FQDN and a corresponding local network interface adapter IP address. The DNS query request may further specify a remote DNS server IP address and a corresponding remote port.

At block 706, it may be determined whether the FQDN of the DNS query request is associated with at least one of the obtained configuration policies. In some embodiments, the FQDN or local IP address of the DNS query request may be compared to the IP addresses and FQDNs specified in the configuration policies. Based on the comparison it may be determined whether the DNS query request is associated with at least one of the configuration policies.

At block 708, the DNS query request may be directed to an alternative DNS destination. For instance, responsive to a determination that the particular FQDN is not included in the FQDNs or IP addresses associated with the configuration policies. As described elsewhere in the present disclosure, the DNS query request may be routed to a DNS redirector that is configured to generate a DNS response corresponding to the DNS query request.

At block 710, a DNS response may be generated. The DNS response may be generated that includes an error code. The DNS response may be generated at the alternative DNS destination. At block 712, the DNS response may be injected or reinjected. For instance, the DNS response may be injected into a TCP/IP stack or another OS component.

At block 714, the TCP/IP stack may facilitate routing of the DNS response to the DNS client. Specifically, the TCP/IP stack may facilitate routing the DNS response to the DNS client that originally made the DNS query request. In some embodiments, the DNS response may first be intercept, and a remote DNS server IP address of the DNS response may be modified to identify the DNS client that originally made the DNS query request that correspondingly led to generation of the DNS response.

As described elsewhere in the present disclosure, the DNS client may determine that it has received an error response because the DNS response includes an error code. In some embodiments, based on receiving the DNS response, the DNS client may generate an updated DNS query request based on a second network interface adapter. In these and other embodiments, the updated DNS query request may include the same or a similar local IP address and/or FQDN as the original DNS query request but on the second network interface adapter. Additionally or alternatively, the updated DNS query request may include the same or a similar requested remote DNS server IP address and/or remote port as the original DNS query request.

Figure 8A:
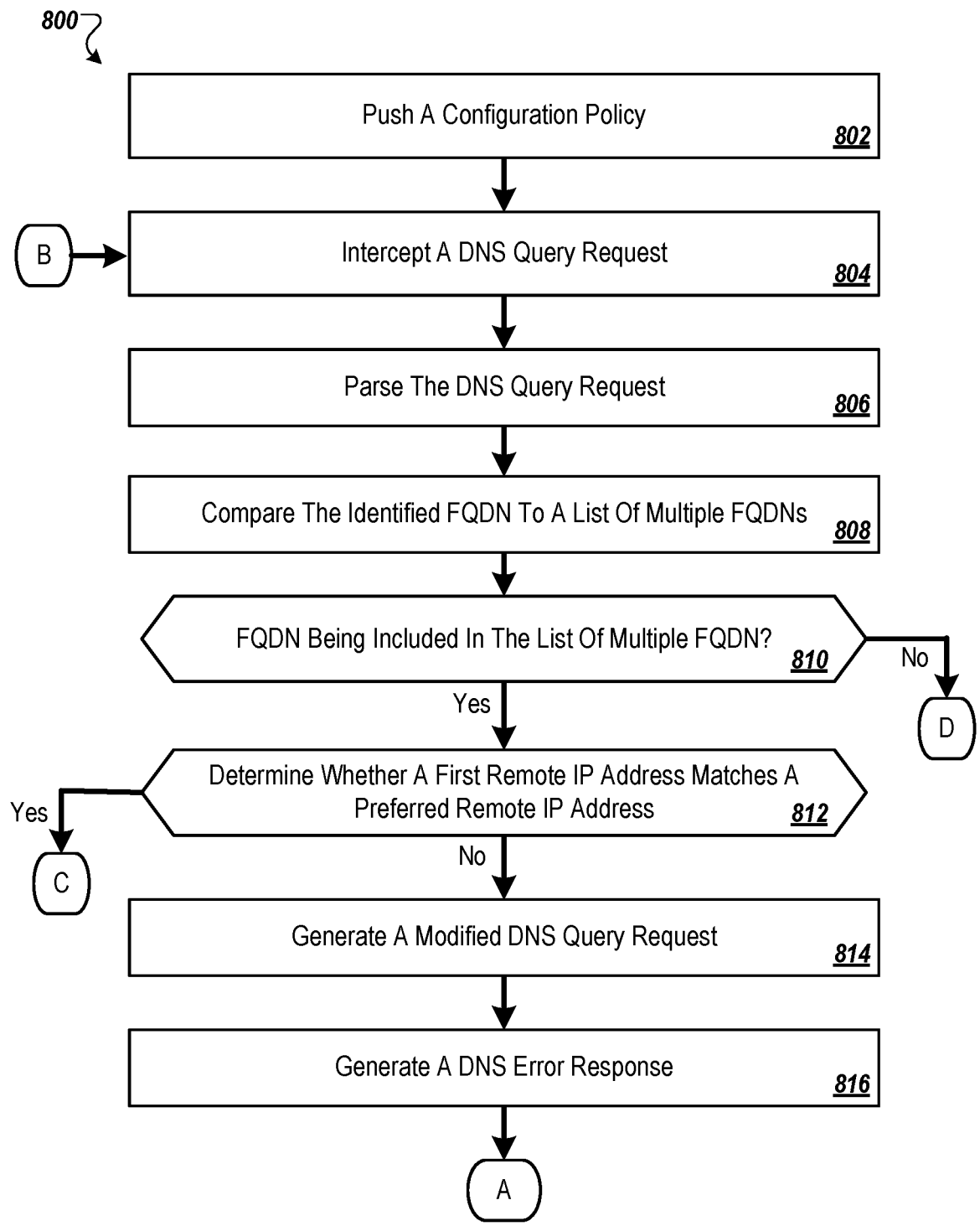
FIGS. 8A and 8B are a flow chart of an example method of split DNS tunnelling in a multi-network interface client system, all according to at least one embodiment of the present disclosure.
Figure 8B:
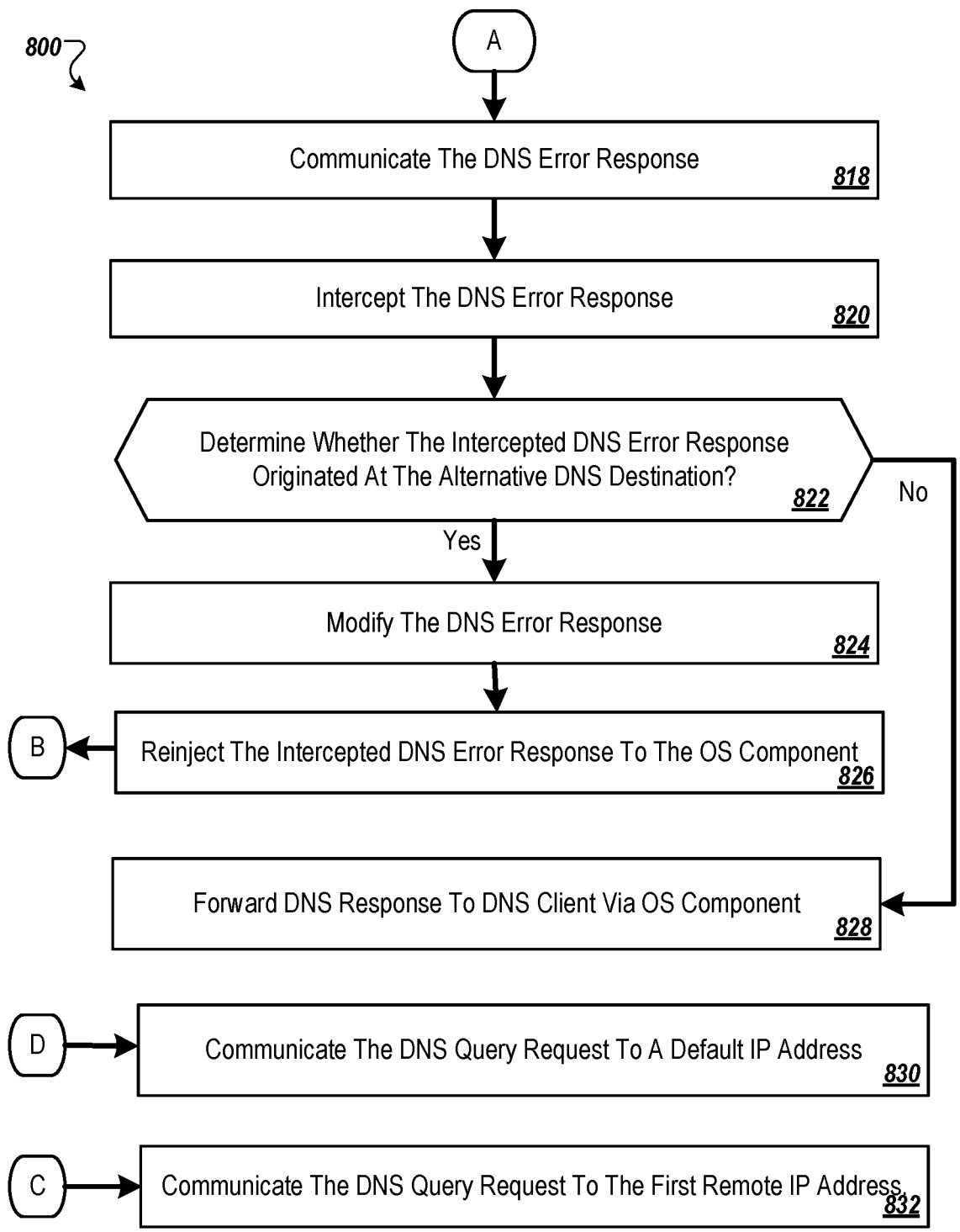

FIGS. 8A and 8B are a flow chart of an example method 800 of split DNS tunnelling in a multi-network interface client system, according to at least one embodiment of the present disclosure. For instance, network interfaces of the client system may include VPN adapters. For instance, the client system may include one or more network interfaces that each include VPN adapters. The client system may implement the method 800 to route data to a specific one VPN adapter of the multiple VPN adapters for a particular FQDN.

Referring to FIG. 8A, the method 800 may begin at block 802 in which a configuration policy may be pushed. The configuration policy may be pushed from a policy configurator. The policy configurator may be included in a user mode of the multi-network interface client system. The configuration policy may be pushed to a DNS capture module, which may be included in a kernel mode of the client system or portion thereof.

In some embodiments, the configuration policy may be pushed responsive to connection of the client system to a network. The configuration policy may be a basis from which split tunnelling operations between multi-network interfaces are performed. For example, the configuration policy may include a list of multiple FQDNs. The FQDNs on the list may be designated for either inclusion in the VPN tunnelling operation or excluded from the VPN tunnelling operation. Additionally, the configuration policy may include a list of preferred remote IP addresses. The preferred remote IP addresses may correspond to preferred VPN adapters or preferred network interfaces. The remote IP addresses may indicate which of the network interfaces utilized for data traffic communicated with the FQDN. Additionally, the configuration policy may include a mapping between the multiple FQDNs and preferred remote IP addresses of the list of preferred remote IP addresses. In some embodiments, the configuration policy may also include one or more default IP addresses. Some additional details of the default IP address are provided below.

At block 804, a DNS query request may be intercepted. The DNS query request may be intercepted by the DNS capture module. The DNS query request may originate at a DNS client and then communicated to the OS component. The OS component may be included in the kernel mode of the client system or portion thereof. Additionally, the OS component may be organized or implement the TCP/IP stack. The DNS query request is directed to a FQDN, which is indicated in the DNS query request. In addition, the DNS query request may include a first remote internet protocol (IP) address of a first network interface of the client system.

At block 806, the DNS query request may be parsed. The DNS query request may be parsed to identify the FQDN and the first remote IP address. At block 808, the identified FQDN may be compared to the list of multiple FQDNs. As introduced above, the list of multiple FQDNs includes a particular set of FQDNs designated for either inclusion in a VPN tunnelling operation or excluded from a VPN tunnelling operation. At block 810, it may be determined, based on the comparison in block 808, whether the identified FQDN of the DNS query request is included in the list of multiple FQDNs. Responsive to the identified FQDN being included in the list of multiple FQDN ("YES" at block 810), the method 800 may proceed to block 812. Responsive to the identified FQDN not being included in the list of multiple FQDN ("NO" at block 810), the method 800 may proceed to block 830 of FIG. 8B.

At block 812, it may be determined whether the first remote IP address matches a preferred remote IP address for the identified FQDN. Responsive to the first remote IP address not matching the preferred remote IP address for the identified FQDN ("NO" at block 812), the method 800 may proceed to block 814. Responsive to the first remote IP address matching the preferred remote IP address for the identified FQDN ("YES" at block 812), the method 800 may proceed to block 832 of FIG. 8B.

At block 814, a modified DNS query request may be generated. In the modified DNS query request the first remote IP address (e.g., a destination address) is changed to an IP address of an alternative DNS destination of an DNS redirector. In some embodiments, the DNS redirector may be included on the user mode of the client system. Additionally or alternatively, the alternative DNS destination is at least a portion of a local user datagram protocol (UDP) server.

In some embodiments, the modified DNS query request may further include a transaction identifier. The transaction identifier may be used to track the modified DNS query request as it is communicated and modified. The transaction identifier may be added to or otherwise supplement an element representing the IP address of the alternative DNS destination. In some embodiments, the DNS capture module may perform one or more operations of the blocks 804, 806, 808, 810, 812, 814, or combinations thereof. The DNS query request may be intercepted from an operating system (OS) component.

At block 816, a DNS error response may be generated. The DNS error response may be generated at least partially at the DNS redirector. In some embodiments, the DNS error response includes an error code. The error code may be included as an answer in the DNS error response. The error code may include a format error indicator, a query refused error indicator (REFUSED), a not implemented error indicator (NotImp), a non-existent domain indicator (NXDomain), a server failure indicator (ServFail), a format error indicator (FormErr), no error indicator (NoError), or another error indicator that causes re-address and resubmission of the DNS query request by the DNS client.

In embodiments in which the modified DNS query request includes the transaction identifier, the DNS error response may be configured to also include the transaction identifier. In these and other embodiments, the transaction identifier may be added to or supplement the first remote IP address in the DNS error response.

Referring to FIG. 8B, at block 818, the DNS error response may be communicated. The DNS error response may be communicated to the OS component from the DNS redirector in some embodiments. At block 820, the DNS error response may be intercepted. The DNS error response may be intercepted from the OS component. For instance, the DNS capture module may intercept the DNS error response from the OS component.

At block 822, it may be determined whether the intercepted DNS error response originated at the alternative DNS destination and/or the DNS redirector. Responsive to the intercepted DNS error response originating at the alternative DNS destination ("YES" at block 822), the method 800 may proceed to block 824. Responsive to the intercepted DNS error response not originating at the alternative DNS destination ("No" at block 822), the method 800 may proceed to block 828.

At block 824, the DNS error response may be modified to add the first remote IP address of the DNS query request. For instance, the IP address of the alternative DNS destination that is included in the DNS error request may be replaced by the first remote IP address. In some embodiments, the DNS capture module may modify the intercepted DNS error response. In some embodiments, the IP address of the alternative DNS destination of DNS error response may be modified at the DNS redirector. In these and other embodiments, block 824 may be performed earlier in the method 800.

At block 826, the intercepted DNS error response may be reinjected to the OS component. The intercepted DNS error response may be reinjected to the OS component. In response to the reinjection of the intercepted DNS error response, the DNS error response is communicated to the DNS client. The DNS error response may be processed by the DNS client and/or may trigger generation by the DNS client of a subsequent DNS query request. The subsequent DNS query request may be directed to the FQDN (e.g., the same FQDN of the earlier-processed DNS query request). The subsequent DNS query request may include a second remote IP address of a second network interface of the client system. The second remote IP address is different from the first remote IP address.

In some instances, the DNS client may be configured to automatically generate and communicate the subsequent DNS query request to the OS component. For instance, responsive to the DNS error response that includes the error code, the DNS client may generate the subsequent DNS query request by modifying a remote IP address of a previously communicated DNS query request.

From block 824, the method 800 may proceed to block 804 of FIG. 8A. The method 800 may proceed through operations of blocks 806, 808, 810, 812, 814, 816, 818, 820, 822, 824, 828, 830, 832, or combinations thereof relative to the subsequent DNS query request. For instance, the subsequent DNS query request may be intercepted (e.g., block 804) and parsed (e.g., block 806). The identified FQDN of the subsequent DNS query request may be compared to the list of multiple FQDNs. The modified DNS query request and the DNS error response may be generated based on the subsequent DNS query request responsive to the second remote IP address not matching a preferred IP address. The DNS error response generated based on the subsequent DNS query request may trigger another subsequent DNS query, which may be processed in accordance with the method 800. These portions of the method 800 may occur until the FQDN is included in the list of multiple FQDNs ("YES" at 810) and the remote IP address of a DNS query response (e.g., the DNS query response, subsequent DNS query response, or an additional subsequent DNS query response) matches the preferred remote IP address associated with the FQDN ("YES" at block 812). In these circumstances, the method 800 may proceed to block 830. At block 830, the DNS query request may be communicated to a default IP address. The DNS query request may be communicated to a default IP address responsive to the identified FQDN not being included in the list of multiple FQDN. The default IP address may correspond to a default DNS server and may be included in the configuration policy.

The method 800 may also implement an operation for FQDNs that are not specifically included in the configuration policy. For instance, in response to the FQDN of the DNS query request not being included in the list of multiple FQDNs ("NO" at block 810), the method 800 my proceed to block 832. At block 832, the DNS query request may be communicated to the first remote IP address. The DNS query request may be communicated to the first remote IP address responsive to the first remote IP address matching the preferred remote IP address for the identified FQDN. The operation of block 832 may ultimately be performed relative to a subsequent DNS query request.

The methods 700 and 800 may be performed by any suitable system, apparatus, or device. For example, the policy configurator 110, the DNS capture module 120, the DNS client 130, or the DNS redirector 150 may perform one or more operations associated with the method 200. Although illustrated with discrete blocks, the steps and operations associated with one or more of the blocks of the method 200 may be divided into additional blocks, combined into fewer blocks, or eliminated, depending on the particular implementation.

The methods 700 and 800 may be performed by the client system 104 described elsewhere in the present disclosure or by another suitable computing system, such as the computer system 600 of FIG. 6. In some embodiments, the client system 104 or the other computing system may include or may be communicatively coupled to a non-transitory computer-readable medium (e.g., the memory 612 of FIG. 6) having stored thereon programming code or instructions that are executable by one or more processors (such as the processor 610 of FIG. 6) to cause a computing system or the client system 104 to perform or control performance of the methods 700 and 800. Additionally or alternatively, the client system 104 may include the processor 610 that is configured to execute computer instructions to cause the client system 104 or other computing systems to perform or control performance of the methods 700 and 800. The client system 104 or the computer system 600 implementing the methods 700 and 800 may be included in a cloud-based managed network, an on-premises system, or another suitable network computing environment. Although illustrated as discrete blocks, one or more blocks in FIGS. 7-8B may be divided into additional blocks, combined into fewer blocks, or eliminated, depending on the desired implementation.

Modifications, additions, or omissions may be made to the methods 700 and 800 without departing from the scope of the disclosure. For example, the designations of different elements in the manner described is meant to help explain concepts described herein and is not limiting. Further, the methods 700 and 800 may include any number of other elements or may be implemented within other systems or contexts than those described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method of split domain name server (DNS) tunnelling in a multi-network interface client system, the method comprising:
   intercepting a DNS query request from an operating system (OS) component, wherein the DNS query request originates at a DNS client, the DNS query request is directed to a fully qualified domain name (FQDN), and includes a first remote internet protocol (IP) address of a first network interface of a client system;
   parsing the DNS query request to identify the FQDN and the first remote IP address;
   comparing the identified FQDN to a list of multiple FQDNs designated for either inclusion in a virtual private network (VPN) tunnelling operation or excluded from a VPN tunnelling operation;
   responsive to the identified FQDN being included in the list of multiple FQDN, determining whether the first remote IP address matches a preferred remote IP address for the identified FQDN;
   responsive to the first remote IP address not matching the preferred remote IP address for the identified FQDN, generating a modified DNS query request in which the first remote IP address is changed to an IP address of an alternative DNS destination;
   generating, at the alternative DNS destination, a DNS error response, wherein the DNS error response includes an error code and the first remote IP address of the DNS query request;
   communicating the DNS error response to the OS component;
   intercepting the DNS error response from the OS component;
   determining whether the intercepted DNS error response originated at the alternative DNS destination; and
   responsive to the intercepted DNS error response originating at the alternative DNS destination, reinjecting the intercepted DNS error response to the OS component such that the DNS error response is communicated to the DNS client and such that the DNS client generates a subsequent DNS query request directed to the FQDN and including a second remote IP address of a second network interface of the client system.

2. The method of claim 1, further comprising:
   intercepting the subsequent DNS query request from the OS component;

parsing the subsequent DNS query request to identify the FQDN and the second remote IP address;

comparing the identified FQDN to the list of multiple FQDNs designated for either inclusion in the VPN tunnelling operation or excluded from the VPN tunnelling operation;

responsive to the identified FQDN being included in the list of multiple FQDNs, determining whether the second remote IP address matches the preferred remote IP address for the identified FQDN; and responsive to the second remote IP address matching the preferred remote IP address for the identified FQDN, communicating the subsequent DNS query request to the second remote IP address.

3. The method of claim 1, further comprising communicating the DNS query request to a default IP address of a default DNS server responsive to the identified FQDN not being included in the list of multiple FQDN.

4. The method of claim 3, further comprising pushing a configuration policy from a policy configurator responsive to connection of the client system to a network, wherein the configuration policy includes the list of multiple FQDNs designated for either inclusion in the VPN tunnelling operation or excluded from the VPN tunnelling operation, a list of preferred remote IP addresses, a mapping between the multiple FQDNs and preferred remote IP addresses of the list of preferred remote IP addresses, and the default IP address.

5. The method of claim 4, wherein:
the DNS client and the alternative DNS destination are located in a user mode of the client system;
the DNS query request is intercepted on a first portion of a kernel mode of the client system;
the configuration policy is stored on the first portion of the kernel mode;
the OS component is included a second portion of the kernel mode;
the DNS query request is parsed and compared to the configuration policy on the first portion of the kernel mode; and
the modified DNS query request is generated on the first portion of the kernel mode.

6. The method of claim 1, further comprising:
responsive to the first remote IP address matching the preferred remote IP address for the identified FQDN, communicating the DNS query request to the first remote IP address.

7. The method of claim 1, wherein:
the modified DNS query request further includes a transaction identifier; and
the transaction identifier is further included in the DNS error response.

8. The method of claim 1, wherein:
the preferred remote IP address is the IP address of a preferred network interface;
the preferred network interface is a preferred VPN adapter;
the first network interface is a first VPN adapter; and
the second network interface is a second VPN adapter.

9. The method of claim 1, wherein:
the error code is included as an answer in the DNS error response; and
the error code includes a format error indicator.

10. The method of claim 1, wherein the alternative DNS destination is at least a portion of a local User Datagram Protocol (UDP) server.

11. A method of split DNS tunnelling, comprising:
obtaining a plurality of Domain Name System (DNS) configuration policies, each DNS configuration policy of the plurality of DNS configuration policies indicating how to direct a DNS query according to one or more Internet Protocol (IP) addresses or Fully Qualified Domain Names (FQDNs);

obtaining a DNS query request on a first network interface adapter, the DNS query request being obtained from a DNS client and directed toward a particular FQDN;

determining whether the particular FQDN included with the DNS query request is included in the FQDNs or IP addresses associated with the plurality of DNS configuration policies;

responsive to a determination that the particular FQDN is not included in the FQDNs or IP addresses associated with the plurality of DNS configuration policies, directing the DNS query request to an alternative DNS destination;

generating, at the alternative DNS destination, a DNS response that includes an error code;

injecting the DNS response into a Transport Control Protocol (TCP)/IP stack;

sending the DNS response to the DNS client from which the DNS query request was obtained; and obtaining an updated DNS query request on a second network interface adapter from the DNS client responsive to the DNS client receiving the DNS response.

12. The method of claim 11, wherein one or more DNS configuration policies of the plurality of DNS configuration policies include:
inclusion policies that specify one or more IP address or FQDNs to which the DNS query is allowed to be directed responsive to the DNS query matching the IP addresses or FQDNs specified in the inclusion policies;
exclusion policies that specify one or more IP address or FQDNs to which the DNS query is not allowed to be directed responsive to the DNS query matching the IP addresses or FQDNs specified in the exclusion policies; and
default policies that specify one or more IP address or FQDNs to which the DNS query is directed responsive to the DNS query not matching the IP addresses or FQDNs specified in the inclusion policies or the exclusion policies.

13. The method of claim 11, wherein the DNS response further includes at least one of: a FQDN corresponding to the particular FQDN of the DNS query request, a local IP address associated with the first network interface adapter, and a remote IP address associated with a DNS server.

14. One or more non-transitory computer-readable medium having encoded therein programming code executable by one or more processors to perform or control performance of operations of split domain name server (DNS) tunnelling in a multi-network interface client system, the operations comprising:
intercepting a DNS query request from an operating system (OS) component, wherein the DNS query request originates at a DNS client, the DNS query request is directed to a fully qualified domain name (FQDN), and includes a first remote internet protocol (IP) address of a first network interface of a client system;
parsing the DNS query request to identify the FQDN and the first remote IP address;
comparing the identified FQDN to a list of multiple FQDNs designated for either inclusion in a virtual private network (VPN) tunnelling operation or excluded from a VPN tunnelling operation;

responsive to the identified FQDN being included in the list of multiple FQDN, determining whether the first remote IP address matches a preferred remote IP address for the identified FQDN;

responsive to the first remote IP address not matching the preferred remote IP address for the identified FQDN, generating a modified DNS query request in which the first remote IP address is changed to an IP address of an alternative DNS destination;

generating, at the alternative DNS destination, a DNS error response, wherein the DNS error response includes an error code and the first remote IP address of the DNS query request;

communicating the DNS error response to the OS component;

intercepting the DNS error response from the OS component;

determining whether the intercepted DNS error response originated at the alternative DNS destination;

responsive to the intercepted DNS error response originating at the alternative DNS destination, reinjecting the intercepted DNS error response to the OS component such that the DNS error response is communicated to the DNS client and such that the DNS client generates a subsequent DNS query request directed to the FQDN and including a second remote IP address of a second network interface of the client system intercepting the subsequent DNS query request from the OS component;

parsing the subsequent DNS query request to identify the FQDN and the second remote IP address;

comparing the identified FQDN to the list of multiple FQDNs designated for either inclusion in the VPN tunnelling operation or excluded from the VPN tunnelling operation;

responsive to the identified FQDN being included in the list of multiple FQDN, determining whether the second remote IP address matches the preferred remote IP address for the identified FQDN; and responsive to the second remote IP address matching the preferred remote IP address for the identified FQDN, communicating the subsequent DNS query request to the second remote IP address.

15. The one or more non-transitory computer-readable medium of claim 14, wherein the operations further comprise:

communicating the DNS query request to a default IP address of a default DNS server responsive to the identified FQDN not being included in the list of multiple FQDN; and communicating the DNS query request to the first remote IP address responsive to the first remote IP address matching the preferred remote IP address for the identified FQDN.

16. The one or more non-transitory computer-readable medium of claim 15, wherein the operations further comprise:

pushing a configuration policy from a policy configurator responsive to connection of the client system to a network, wherein the configuration policy includes the list of multiple FQDNs designated for either inclusion in the VPN tunnelling operation or excluded from the VPN tunnelling operation, a list of preferred remote IP addresses, a mapping between the multiple FQDNs and preferred remote IP addresses of the list of preferred remote IP addresses, and the default IP address.

17. The one or more non-transitory computer-readable medium of claim 16, wherein:

the DNS client and the alternative DNS destination are located in a user mode of the client system;

the DNS query request is intercepted on a first portion of a kernel mode of the client system;

the configuration policy is stored on the first portion of the kernel mode;

the OS component is included a second portion of the kernel mode;

the DNS query request is parsed and compared to the configuration policy on the first portion of the kernel mode; and the modified DNS query request is generated on the first portion of the kernel mode.

18. The one or more non-transitory computer-readable medium of claim 14, wherein:

the modified DNS query request further includes a transaction identifier; and the transaction identifier is further included in the DNS error response.

19. The one or more non-transitory computer-readable medium of claim 14, wherein:

the preferred remote IP address is the IP address of a preferred network interface;

the preferred network interface is a preferred VPN adapter;

the first network interface is a first VPN adapter; and the second network interface is a second VPN adapter.

20. The one or more non-transitory computer-readable medium of claim 14, wherein:

the error code is included as an answer in the DNS error response;

the error code includes a format error indicator; and the alternative DNS destination is at least a portion of a local User Datagram Protocol (UDP) server.

* * * * *